(12) United States Patent
Filippi et al.

(10) Patent No.: US 8,369,428 B2
(45) Date of Patent: Feb. 5, 2013

(54) METHOD OF SYNCHRONIZING MULTI-CARRIER SYSTEMS AND MULTI-CARRIER SYSTEM

(75) Inventors: Alessio Filippi, Eindhoven (NL); Semih Serbetli, Eindhoven (NL); Ying Wang, Eindhoven (NL)

(73) Assignee: NXP B.V., Eindhoven (NL)

( * ) Notice: Subject to any disclaimer, the term of this patent is extended or adjusted under 35 U.S.C. 154(b) by 637 days.

(21) Appl. No.: 12/525,121

(22) PCT Filed: Feb. 7, 2008

(86) PCT No.: PCT/IB2008/050439
§ 371 (c)(1),
(2), (4) Date: Jul. 30, 2009

(87) PCT Pub. No.: WO2008/096322
PCT Pub. Date: Aug. 14, 2008

(65) Prior Publication Data
US 2010/0034302 A1    Feb. 11, 2010

(30) Foreign Application Priority Data
Feb. 9, 2007  (EP) .................................... 07002802

(51) Int. Cl.
*H04K 1/10* (2006.01)
(52) U.S. Cl. ...................................................... 375/260
(58) Field of Classification Search .................. 370/203, 370/208, 342, 480; 375/235, 260, 267, 356
See application file for complete search history.

(56) References Cited

U.S. PATENT DOCUMENTS

| | | | |
|---|---|---|---|
| 5,764,630 A * | 6/1998 | Natali et al. | 370/320 |
| 6,421,401 B1 * | 7/2002 | Palin | 375/343 |
| 7,397,758 B1 * | 7/2008 | Hart et al. | 370/208 |
| 2003/0072254 A1 | 4/2003 | Ma et al. | |

(Continued)

FOREIGN PATENT DOCUMENTS

| | | |
|---|---|---|
| CN | 1490951 A | 4/2004 |
| WO | 2005002164 A1 | 1/2005 |

(Continued)

OTHER PUBLICATIONS

Keller, Thomas; et al; "Orthogonal Frequency Division Multiplex Synchronization Techniques for Frequency-Selective Fading Channels"; IEEE Journal on Selected Areas in Communications; IEEE Service Center, Piscataway, US; vol. 19, No. 6; Jun. 1, 2001; p. 999-1006.

(Continued)

*Primary Examiner* — Leon-Viet Nguyen
(74) *Attorney, Agent, or Firm* — Kramer & Amado P.C.

(57) ABSTRACT

A method of synchronizing multi-carrier systems is provided, wherein the method comprises inserting a predefined frequency domain signal into a signal on a transmitter side of a multi-carrier system and multi-carrier modulating the signal. Furthermore, the method comprises transmitting the multi-carrier modulated signal via a carrier channel to a receiving side of the multi-carrier system, and synchronizing the multi-carrier modulated signal by using the predefined frequency domain signal portion of the multi-carrier modulated signal.

18 Claims, 4 Drawing Sheets

U.S. PATENT DOCUMENTS

| | | | |
|---|---|---|---|
| 2005/0213680 A1* | 9/2005 | Atungsiri et al. | 375/260 |
| 2006/0171367 A1* | 8/2006 | Wang | 370/342 |
| 2007/0053448 A1* | 3/2007 | Schwoerer et al. | 375/260 |
| 2007/0211806 A1* | 9/2007 | Mudulodu et al. | 375/260 |
| 2009/0052427 A1* | 2/2009 | Oketani et al. | 370/347 |
| 2010/0142364 A1* | 6/2010 | Sahlman | 370/210 |

FOREIGN PATENT DOCUMENTS

| | | | |
|---|---|---|---|
| WO | 2006099343 A1 | 9/2006 | |

OTHER PUBLICATIONS

Hong, Bin, et al; "Pilot Signal Design Algorithm for Efficient Symbol Time Offset Estiamtion on an OFDM System"; Signal Processing; Elsevier Science Publishers, B.V., Amsterdam, NL; vol. 87, No. 3; Nov. 6, 2006; p. 489-499; XP005732794; ISSN: 0165-1684.

* cited by examiner

METHOD OF SYNCHRONIZING MULTI-CARRIER SYSTEMS AND MULTI-CARRIER SYSTEM

FIELD OF THE INVENTION

The invention relates to a method of synchronizing multi-carrier systems, in particular Orthogonal Frequency-Division Multiplexing systems.

Beyond this, the invention relates to a multi-carrier system, in particular an Orthogonal Frequency-Division Multiplexing system.

Furthermore, the invention relates to a computer-readable medium.

Beyond this, the invention relates to a program element.

BACKGROUND OF THE INVENTION

Orthogonal Frequency-Division Multiplexing (OFDM) is a well known multi-carrier modulation technique which can provide significant robustness to channel with long delay spreads at the cost of a loss in spectral efficiency. It has been adopted in many standards such as, for instance, IEEE 802.11a/n and the Digital Video Broadcasting for Terrestrial and Handheld (DVB-T/H). In OFDM, N complex symbols are transmitted in parallel so that each complex symbol modulates a single sub-carrier within the available bandwidth. The OFDM transmitter efficiently modulates all the N sub-carriers through an N-point inverse discrete Fourier transform (IDFT) efficiently implemented via a inverse fast Fourier transform (IFFT) algorithm. The output of the IDFT consists of N samples which are referred to as an OFDM symbol. The OFDM symbol is usually cyclically extended and transmitted over the air. The receiver matches the transmitter and, after the removal of the cyclic extension, performs a DFT to jointly demodulate all N sub-carriers. If the cyclic extension is at least as long as the maximum delay spread of the channel, if the channel is static during the duration of one OFDM symbol and if the receiver is perfectly synchronized to the transmitter, then the sub-carrier orthogonality is maintained at the receiver. Therefore, the data transmitted on each sub-carrier can be recovered with simple equalization algorithms. However, the receiver has to be synchronized with the transmitter both in frequency and time. The time synchronization in OFDM systems selects the block of samples to be processed by a receiver DFT. There is a significant amount of literature dealing with synchronization algorithms for OFDM systems. The most common methods use a cyclic extension to jointly detect the beginning of the OFDM symbol and correct the frequency offset. However, these methods are optimal only for non-frequency selective channels. In the presence of multipath channels, they only provide a coarse time synchronization which usually needs to be refined.

OBJECT AND SUMMARY OF THE INVENTION

It is an object of the invention to provide a method of synchronizing a multi-carrier system, and a multi-carrier system, wherein the method may yield a more accurate synchronization.

In order to achieve the object defined above, a method of synchronizing a multi-carrier system, a multi-carrier system, a computer-readable medium, and a program element according to the independent claims are provided.

According to an exemplary embodiment a method of synchronizing multi-carrier systems is provided, wherein the method comprises inserting a predetermined frequency domain signal into a signal on a transmitter side of a multi-carrier system and multi-carrier modulating the signal. Furthermore, the method comprises transmitting the multi-carrier modulated signal via a carrier to a receiving side of the multi-carrier system, and synchronizing the multi-carrier modulated signal by using the predefined frequency domain signal portion of the multi-carrier modulated signal. In particular, the synchronizing may be done before a multi-carrier demodulation of the multi-carrier modulated signal, e.g. the frequency domain pilot may be analyzed in the time domain. For example, the Fourier transform multi-carrier modulate the signal including the frequency pilot from the frequency domain into the time domain. The multi-carrier modulation may also be called transform.

According to an exemplary embodiment a multi-carrier system is provided, wherein the system comprises a unit adapted to insert a predetermined frequency domain signal into a signal on a transmitter side of the multi-carrier system, and a unit adapted to multi-carrier modulate the signal. Furthermore, the system comprises a unit adapted to transmit the multi-carrier modulated signal via a carrier to a receiving side of the multi-carrier system, and a unit adapted to synchronize the multi-carrier modulated signal by using the predefined frequency domain signal portion of the multi-carrier modulated signal.

According to an exemplary embodiment a program element, is provided which, when being executed by a processor, is adapted to control or carry out a method of synchronizing multi-carrier systems, wherein the method comprises inserting a predetermined frequency domain signal into a signal on a transmitter side of a multi-carrier system and multi-carrier modulating the signal by, for instance, a Fourier transform. Furthermore, the method comprises transmitting the multi-carrier modulated signal via a carrier to a receiving side of the multi-carrier system and synchronizing the multi-carrier modulated signal by using the pilot signal portion of the multi-carrier modulated signal.

According to an exemplary embodiment a computer-readable medium is provided, in which a computer program is stored which, when being executed by a processor, is adapted to control or carry out a method of synchronizing multi-carrier systems, wherein the method comprises inserting a predetermined frequency domain signal into a signal on a transmitter side of a multi-carrier system and multi-carrier modulating the signal. Furthermore, the method comprises transmitting the multi-carrier modulated signal via a carrier channel to a receiving side of the multi-carrier system and synchronizing the multi-carrier modulated signal by using the predefined frequency domain signal portion of the multi-carrier modulated signal. In particular, the multi-carrier system may be a system which performs a linear transformation of the signal to be transmitted.

In particular, data processing or signal processing which may be performed according to embodiments of the invention can be realized by a computer program, that is by software, or by using one or more special electronic optimization circuits, that is in hardware, or in hybrid form, that is by means of software components and hardware components.

It may be seen as a gist of an exemplary embodiment that a method of synchronizing multi-carrier systems, e.g. Orthogonal Frequency-Division Multiplexing systems, is provided, according which method a predefined frequency domain signal, e.g. a standardized pilot signal, is inserted in the frequency domain. The predefined frequency domain signal thus forms a portion of the signal multi-carrier modulated by a Fourier transform, or, equivalently transformed into the time domain. This frequency domain may also be seen in the time domain, since, in particular a discrete Fourier transform is a linear operation. Thus, the predefined frequency domain signal, e.g. the frequency domain pilot, may be used, beside the fact that it may be used for channel estimation, for channel synchronization, since a portion of the received signal, prior to the multi-carrier demodulation which consists of an Inverse Fourier transform for an OFDM system, on the receiving side, is known. Thus, it may be possible that a receiver may use such a known pilot sequence prior to the multi-carrier demodulation, which is a Fourier transform for an OFDM system, and it may be possible to use this information to improve the time synchronization. In particular, the channel synchronization in OFDM systems may not only depend on information of channel prefixes in a guard interval any more. Such a method may in particular form a fast and robust frame synchronization method targeting DVB-T/H systems. Summarizing, a method may be provided which is a new frame synchronization method for multi-carrier systems, e.g. OFDM based systems, wherein frequency domain pilots are not only used for frequency domain channel estimation but also for channel synchronization prior to the receiver multi-carrier demodulation or transform. The proposed method may be in particular more precise, fast and robust. In particular, an averaging filter may be on the multi-carrier modulated signal, e.g. an averaging filter as long as 5% of the guard interval.

The term "predefined frequency domain signal" may particularly denote a hidden and/or superimposed known signal. For example, such a predefined frequency domain may be formed by a frequency domain pilot signal. However, each known signal, i.e. each signal which is known to the receiving side, may be used.

The term "pilot" or "pilot signal" may particularly denote a signal inserted in some or all of the carriers or sub-carriers of the multi-carrier system, e.g. Orthogonal Frequency-Division Multiplexing (OFDM) signals. For example, some symbols of the OFDM may carry pilot signals for measurement of the channel conditions also called channel estimation, i.e. the equalizer gain for each sub-carrier. Such a pilot may be formed by a known standardized signal or symbol. The term "frequency domain pilot" may particularly denote that the pilot and the data are orthogonal in the frequency domain.

Next, further exemplary embodiments of the method of synchronizing a multi-carrier system are described. However, these embodiments also apply to the multi-carrier system, the computer-readable medium, and the program element.

According to another exemplary embodiment of the method the multi-carrier system is one system out of the group consisting of, an Orthogonal Frequency Division Multiplexing systems, an Isotropic Orthogonal Transform Algorithm systems, and a Filtered Multi Tone systems.

According to another exemplary embodiment of the method the predetermined frequency domain signal is a frequency domain pilot signal.

According to another exemplary embodiment of the method the multi-carrier modulation is an inverse discrete Fourier transform. In particular, a multi-carrier demodulation of the synchronized multi-carrier modulated signal may be done by using a Fourier transform, e.g. a discrete Fourier transform.

By performing the multi-carrier demodulation by a Fourier transform the signal multi-carrier modulated into the time domain is multi-carrier demodulated back into the frequency domain on the receiving side of a communication system.

According to another exemplary embodiment the method further comprises performing a coarse timing before the synchronizing by using information of a guard interval. In particular, the information of the guard interval may be a cyclic prefix.

Such a cyclic prefix is a repeat of the end of the symbol at the beginning and serves to allow multipath settle before the main data arrives at the receiver. The use of such a cyclic prefix in order to perform a coarse timing may be a suitable method to perform a rough synchronization which may then be improved by a fine synchronization by using the information of the frequency domain pilot signal multi-carrier modulated in the time domain. Such a coarse timing by using guard interval methods may be done by conventional correlation based methods for OFDM symbol synchronization. For example, it may be looked for the location which correlation between samples with a relative delay of N (number of samples) is maximum within a randomly selected window of two received OFDM symbols.

According to another exemplary embodiment of the method the guard interval is detected by maximizing an energy in the carrier.

According to another exemplary embodiment the method further comprises calculating a channel estimation based on the predefined frequency domain signal of the multi-carrier modulated signal. In particular, this may be done by detecting the multi-carrier modulated pilot signal in the transmitted signal.

Summarizing, one exemplary aspect of the invention may be seen in providing an algorithm for improved frame synchronization which algorithm may provide a fast fine time synchronization in a Single-Frequency Network (SFN). The algorithm may in particular comprise all or at least some of the following steps of: coarse timing through guard interval methods, detecting a used periodic scattered pilot (SP), correlating the detected SP, e.g. around the detected peak of the SP, with the known selected SP, solving a possible ambiguity problem, and locating a guard interval so that the channel energy is maximum or the interference is minimum. The ambiguity problem may in particular be solved in the same step as the locating of the guard interval, e.g. by using the same metric, i.e. the maximum channel energy. For that a window of a given period is used for averaging $|c(m)|^2$, wherein c(m) are the coefficients of correlation between the time domain signal and the multi-carrier modulated known pilot, while the location of the window which provides the maximum channel energy is selected and provides the guard interval which includes the maximum of the channel energy or the minimum of the interference.

According to an exemplary aspect of the invention a single transmit OFDM symbol is the inverse discrete Fourier transform (IDFT) of N complex symbols a(n) extended with a guard interval. The symbols a(n) may be data d(n) if n belongs to the set D of data sub-carriers, and the symbols a(n) are pilots p(n) if n belongs to the set P of pilot sub-carriers. Thus, the time domain transmit signal may be written as $$s(k) = \sum_{n \in D} d(n) e^{j2\pi \frac{nk}{N}} + \sum_{n \in P} p(n) e^{j2\pi \frac{nk}{N}}$$

It may also possible to define the frequency domain pilot in the time domain as $$P(k) = \sum_{n \in P} p(n) e^{j2\pi \frac{nk}{N}}$$

Furthermore, the time domain receive signal may be given by the convolution between the channel impulse response and the transmitted signal plus an additive white Gaussian noise (AWGN) η(k). It may also be written pointing out the presence of the frequency domain pilot $$r(k) = \sum_l h_l s(k - \tau_l) + \eta(k)$$

$$r(k) = \sum_l h_l \left( \sum_{n \in D} d(n) e^{j2\pi \frac{n(k-\tau_l)}{N}} + \sum_{n \in P} p(n) e^{j2\pi \frac{n(k-\tau_l)}{N}} \right) + \eta(k)$$

By substituting the expression of the frequency domain pilot in the time domain $$r(k) = \sum_l h_l \sum_{n \in D} d(n) e^{j2\pi \frac{n(k-\tau_l)}{N}} + \sum_l h_l P(k - \tau_l) + \eta(k)$$

is obtained. Afterwards the received signal may be correlated with the known superimposed pilot sequence P(k).

$$c(m) = \sum_k r(k) P^*(k - m)$$

$$c(m) = \sum_l h_l \sum_k \sum_{n \in D} d(n) e^{j2\pi \frac{n(k-\tau_l)}{N}} P^*(k-m) +$$

$$\sum_l \sum_k + P(k - \tau_l) P^*(k - m) + \eta(k)$$

wherein the first summand characterizes the interference contribution I(m) while the second summand characterizes the channel impulse response convolved with the autocorrelation function of the time domain frequency pilot $$\sum_l h_l AC_{pilot}(m - \tau_l).$$

If the autocorrelation function is approximated by a delta function, i.e. $AC_{pilot}(m) \approx \delta(m)$, the output of the correlation between the received signal and P(k) becomes $c(m) \approx I(m) + h(m) + \tilde{\eta}(k)$, wherein c(m) provides an approximated estimation of the channel impulse response prior to the receiver DFT. According to this aspect the presence of the known sequence may be exploited through a known method of channel estimation in the time domain (cross-correlation method). The use of such an approach may require the receiver to be already synchronized in frequency, wherein the synchronization may be achieved, for instance, with known methods based on the presence of the guard interval. Furthermore, the receiver may use different subsets of frequency domain pilots to improve the quality of the channel estimate. For instance, the receiver may correlate with the frequency transform of all the frequency domain pilots scatter pilots (SP) and continuous pilots (CP) or correlate with the frequency transform of only the SP. In particular, the interference term I(m) may not be dominant due to the independence of the data and the pilot.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

The illustration in the drawing is schematical. In different drawings, similar or identical elements are provided with the same reference signs.

For the following illustration of the system model, referring to the FIG. 1 to 8, it is considered an OFDM system with N sub-carriers signalling in a frequency selective channel. Each OFDM symbol comprises both data symbols and periodic scattered pilots (SP) as, for instance, shown in FIG. 1.

The data and pilots are multi-carrier modulated in blocks using an N-point Inverse Discrete Fourier Transform (IDFT) to form an OFDM symbol with duration $T_U=NT$, where T is the sampling period. A cyclic prefix of duration $T_G=GT$ is added in front of the signal to prevent/reduce inter-block-interference (IBI) resulting in OFDM symbols of length of $T_S=T_U+T_G=(N+G)T$. With $a_{l,n}$ the transmitted data/pilot over the $n^{th}$ sub-carrier of the $l^{th}$ OFDM symbol, the transmitted discrete time complex baseband signal can be represented as $$s(kT) = \frac{1}{\sqrt{N}} \sum_{l=-\infty}^{\infty} \sum_{n=0}^{N-1} a_{l,n} e^{\frac{j2\pi nk}{N}} \cdot u(kT - (N+G)lT), \quad (1)$$

$$k = -\infty \ldots +\infty$$

with $$u(k) = \begin{cases} 1, & -G \le k < N, \\ 0, & \text{else}. \end{cases} \quad (2)$$

Furthermore, it is assumed that the signal is transmitted over a frequency selective fading channel. For the sake of simpler presentation, it is assumed that the channel is time-invariant and the delays of the paths are integer multiples of the sampling period T, which sampling period is in the following assumed to be T=1 so that the explicit indication of T is avoided in the further. Thus, the channel is a tap delay line with a length of $L_c$, i.e., $$h(m) = \begin{cases} h_m, & m \in [0, L_c \ldots 1], \\ 0, & \text{else}. \end{cases} \quad (3)$$

Figure 1:
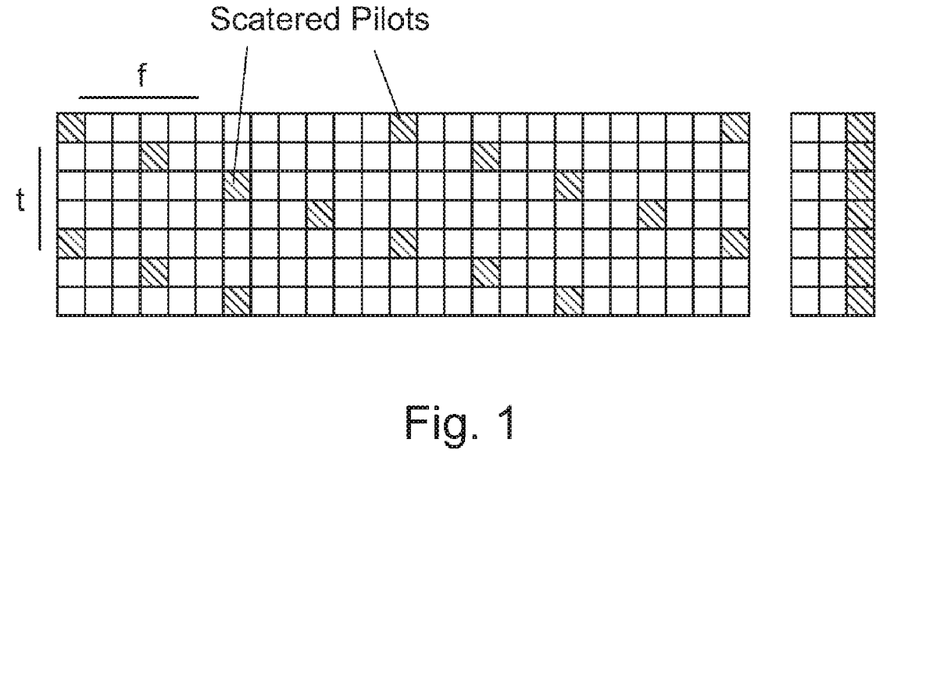
FIG. 1 schematically illustrates an example of scattered pilot (SP) positioning in an OFDM system, wherein black squares indicate the pilot positions, and empty squares indicate the data position.
Figure 2:
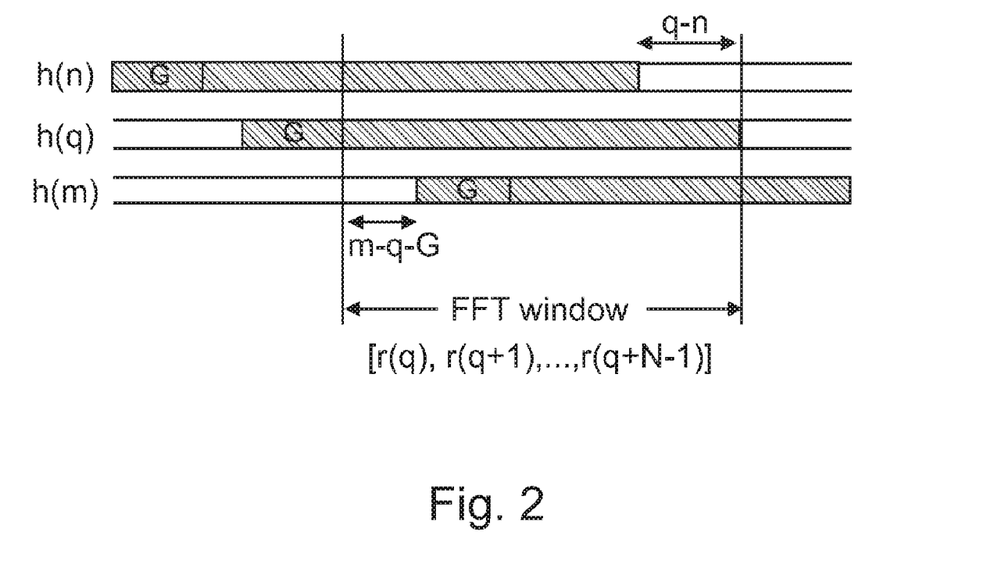
FIG. 2 schematically illustrates effects of a multipath channel on the time domain received OFDM symbols.

The received signal in discrete time can be expressed as $$r(k) = \sum_{m=0}^{L_c-1} h_m s(k-m) + \eta(k), \quad (4)$$

$$k = -\infty \ldots +\infty,$$

where $\eta(k)$ is the additive white Gaussian noise (AWGN) at the receiver. In the case that the synchronization algorithm chooses a DFT window of $[r(q), r(q+1), \ldots, r(q+N-1)]$, $q=-N-G \ldots N+L_c-1$ to decode the $l=0^{th}$ OFDM symbol as depicted in FIG. 2. The level of IBI caused by choosing such a window position is highly dependent on the position of the first sample of the DFT window q, on the length of the guard interval G and on the length of the channel impulse response (CIR) $L_c$. It should be noted that the information belonging to $0^{th}$ OFDM symbol is transmitted through the block $[s(-G), s(-G+1), \ldots, s(N-1)]$, and $s(i)=s(i+N)$ for $i=-G-1$. At first the case $G \ge L_c$ is considered where it can be chosen an IBI free window for the DFT. From (4), the optimum DFT window for IBI-free reception occurs when q is chosen as $L_c-G-1 \le q \le 0$.

If erroneously $q \le L_c-G-1$ is chosen, then there will be IBI from the previous OFDM symbol and the IBI power can be expressed as $$P_{IBI} = \sum_{m=0}^{L_c-1} \max(0, m-q-G)|h_m|^2, \quad (5)$$

$$q = -N-G \ldots L_c - G - 1.$$

Similarly, when $q>0$, then the IBI power resulting from the interference from the next OFDM symbol is $$P_{IBI}(q) = \sum_{m=0}^{L_c-1} \max(0, q-m)|h_m|^2, \quad (6)$$

$$q = 0 \ldots N + L_c - 1.$$

When channels with $L_c>G$ are considered, there is no IBI free window for the DFT. There will be IBI from both previous and next OFDM symbols and IBI power can be expressed as $$P_{IBI}(q) = \sum_{m=0}^{L_c-1} |h_m|^2 f(m-q), \text{ where} \quad (7)$$

$$f(n) = \begin{cases} 0, & n \in [0, G], \\ n - G, & n > G, \\ -n, & n < 0. \end{cases} \quad (8)$$

Figure 3:
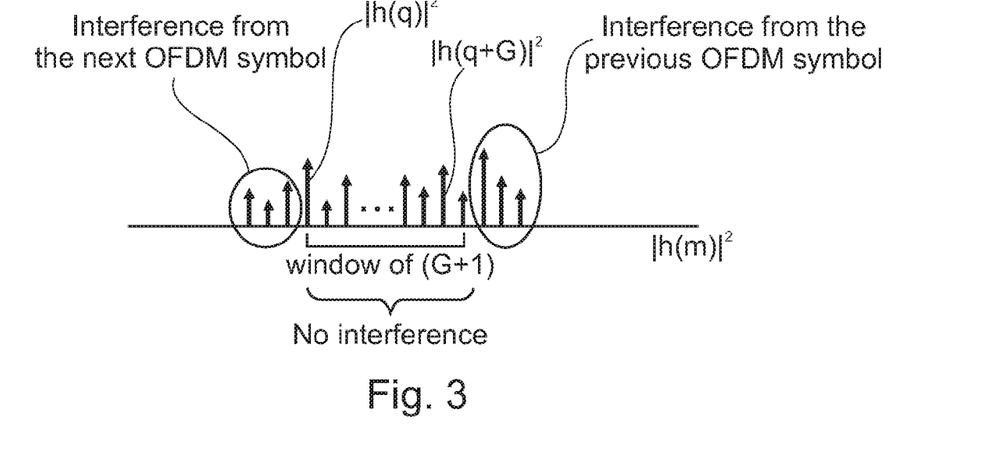
FIG. 3 schematically illustrates equivalent windowing operation done by synchronization.

It can be observed that synchronization is equivalent to a windowing operation on the CIR h(m) of (3) where only a length of (G+1) part of the CIR does not create any IBI and the multipaths outside this window creates IBI, i.e., when a DFT window of $[r(q), r(q+1), \ldots, r(q+N-1)]$ is chosen, h(q), h(q+1), ... h(q+G) does not create any IBI, see FIG. 3. From (5)-(8), it can be observed that for both short and long delay spread channels, inappropriate synchronization leads to IBI. The IBI not only increases the error floor due to the interference from the previous and next OFDM symbols, but also distorts the circulant behaviour of the received signal. Thus, the orthogonality of the sub-carriers is also lost leading to inter-carrier interference (ICI) that further increases the error floor. It should be further noted that the ICI power spread over the frequencies is the same as the IBI power. Based on the above observations, synchronization algorithms should avoid or limit the amount of IBI power. Therefore, with $P_{IBI}$ of (7), it is possible to define the fine time synchronization as $$t_{0,fine} = \arg\min_q P_{IBI}(q). \quad (9)$$

Minimizing the IBI is equivalent to maximizing the signal to interference plus noise ratio (SINR) since the selected window size $N \gg L_c$.

In the previous paragraphs, relating to the system model, it was investigated the effect of synchronization errors on the OFDM symbol reception. It can be observed that incorrect synchronization leads to IBI and ICI that causes performance degradation. In the following paragraphs, relating to the fine time synchronization according to exemplary embodiments of the invention, a fine time synchronization algorithm is proposed that aims at finding $t_{0,fine}$ of (9).

A basic principle of the proposed fine time synchronization is using the SP in frequency domain in a time domain correlation. The SP are commonly used for channel estimation in OFDM systems and they are widely used in the broadcast standards, e.g., DVB-T/H. In these standards, each OFDM symbol consists of N sub-carriers modulated with two disjoint sets, i.e., for $i^{th}$ OFDM symbol, the actual data sub-carrier set, $D_i$, and the SP sub-carrier set $P_i$ used for channel estimation and synchronization. Then, the transmitted OFDM symbol for i=0 is, cf. (1), $$s(k)=d(k)+p(k) \text{ for } k=-G, \ldots N-1, \quad (10)$$

with $$d(k) = \frac{1}{\sqrt{N}} \sum_{n \in D_0} a_{0,n} e^{\frac{j2\pi nk}{N}}, \quad (11)$$

$$p(k) = \frac{1}{\sqrt{N}} \sum_{n \in P_0} a_{0,n} e^{\frac{j2\pi nk}{N}}$$

Thus, the SP in frequency domain is a known sequence superimposed on the data signal in the time domain with auto-correlation function $$R_{p^{(l)}p^{(l')}}(x) = \frac{1}{N+G} \sum_{k=0}^{N+G-1} p^{(l)}(k) p^{(l')*}(k-x), \quad (12)$$

$$x = 0 \ldots N+G-1, l, l' = 0, 1, 2, 3.$$

It can be noticed that the correlation as defined in (12) provides an unbiased estimation since $p^{(l)}(k)$ is defined for $k=0 \ldots 2N+2G-1$. The superscripts l and l' indicate the dependency of the SP sequence on the OFDM symbol index. Proceeding with the example of l=l'=0, after passing through the multipath channel the received signal can be expressed as $$r(k) = d(k) \otimes h(k) + p(k) \otimes h(k) + \eta(k) = \quad (13)$$

$$\sum_{m=0}^{L_c-1} h_m d(k-m) + \sum_{m=0}^{L_c-1} h_m p(k-m) + \eta(k).$$

When the received signal is correlated with the known SP sequence of p(k) of (11), it can be obtained $$c(l) = \sum_{k=0}^{N+G-1} r(k) p^*(k-l) = \sum_{m=0}^{L_c-1} h_m \sum_{k=0}^{N+G-1} p(k-m) p^*(k-l) + \quad (14)$$

$$\sum_{m=0}^{L_c-1} h_m \sum_{k=0}^{N+G-1} d(k-m) p^*(k-l) + \bar{n}(k) =$$

$$\sum_{m=0}^{L_c-1} h_m R_{pp}(m-l) + I(l) + \bar{\eta}(k),$$

where $R_{pp}(x)$ is the autocorrelation function of (12) for l=l'=0 and I(l) is the interference from the data part of the transmitted signal. The properties of $R_{pp}(x)$ depend on the SP in frequency which are usually not designed to be used in time domain. However, if it is assumed that $R_{pp}(x) \approx \delta(x)$, then c(l) of (14) provides a rough channel estimation prior to the receiver DFT. Thus, all the elements are known to describe the general idea of the proposed algorithm. According to an exemplary embodiment the proposed fine synchronization algorithm comprises four steps.

1) Coarse timing. Conventional coarse timing synchronization algorithms based on guard interval detection are used to derive an initial reference point and to estimate/correct the frequency synchronization error. Within a randomly selected window of two OFDM symbols, the algorithm looks for the location for which the correlation between the samples with a relative delay of N is maximum. The algorithms calculates the metric $$\lambda(m') = \left| \sum_{k=0}^{G-1} r(k+m') r(k+m'+N) \right| - \frac{1}{2} \left( \begin{array}{l} |r(k+l)|^2 + \\ |r(k+m'+N)|^2 \end{array} \right), \quad (15)$$

$$m' = 0 \ldots N+G-1,$$

and selects the coarse timing $t_{0,coarse}$ as the position of the maximum of $\lambda(m')$ i.e., $$t_{0,coarse} = \arg\max_{m'} \lambda(m') \quad (16)$$

Thus, we obtain a coarse estimate of where the OFDM symbol starts. Moreover, (15) also provides a frequency offset estimation which needs to be corrected before correlating the received signal with a known sequence.

2) Time domain correlation. The correlation c(l) of (14) is calculated to derive a rough estimate of the channel impulse response h(m) of (3). Since the coarse timing $t_{0,coarse}$ of (16) is within the support of the channel impulse response h(m), the correlation c(l) is calculated around $t_{0,coarse}$. The exact span of c(l) depends on the expected maximum length of the channel impulse response, e.g. on the guard interval.

3) Metric calculation. The metric $P_{IBI}(q)$ of (7) is calculated based on the rough channel estimation obtained in time domain correlation step (step 2).

4) Fine synchronization. The fine time synchronization $t_{0,fine}$ of (9) is founded as the minimum of the metric calculation step (step 3).

The algorithm can be applied to any OFDM system which uses frequency domain pilot for channel estimation. However, the pilots are usually designed to be used in the frequency domain and their properties in the time domain might not be as desired so that improvements may be advantageous. Thus, in the following, two possible approaches suitable for the DVB-T/H standard are explained in greater detail.

Before the two exemplary approaches are described in greater detail the DVB-T/H standard will be shortly described. The DVB-T/H standard defines the physical layer to be used in the broadcast of digital video signal over the terrestrial radio channel. The handheld version (DVB-H) adds only minor changes to the DVB-T physical layer and it has to deal with mobile radio channels. DVB-T/H defines an OFDM based modulation with 2 k, 4 k or 8 k sub-carries and guard interval options from $\frac{1}{32}$ of the OFDM symbol duration up to $\frac{1}{4}$ of the OFDM symbol duration. One peculiar characteristic of DVB-T/H is related to the network used to deployed DVB-T/H services. The transmitters are organized in SFN in which multiple transmitters synchronously transmit the same signal in the same frequency. In the presence of an SFN, the receiver experiences very long artificially created channels depending on its relative location with respect to the transmitters. OFDM is known to be robust with respect to long channel, however, the SFN channels create significant challenges for the time synchronization because conventional time synchronization algorithms tend to synchronize with respect to the strongest path of the channel impulse response. In the presence of SFN, the strongest path might not be the first path to arrive. For instance a far away transmitter in line of sight might generate a strong path which arrives later than the close by non-line of sight second transmitter. For DVB-T is crucial to have a fine time synchronization algorithm which takes care of properly synchronize the DFT window. The most common approach consists of using the frequency domain channel estimation to refine the DFT positioning.

With the algorithms according to exemplary embodiments of the invention, it may be possible to achieve a fine time synchronization prior to the receiver DFT while no requirement to go back and forward from the time to the frequency domain via N-point DFTs might be given. On contrary, the DVB-T/H SP inserted in the frequency domain are exploited in the following two approaches.

Figure 4:
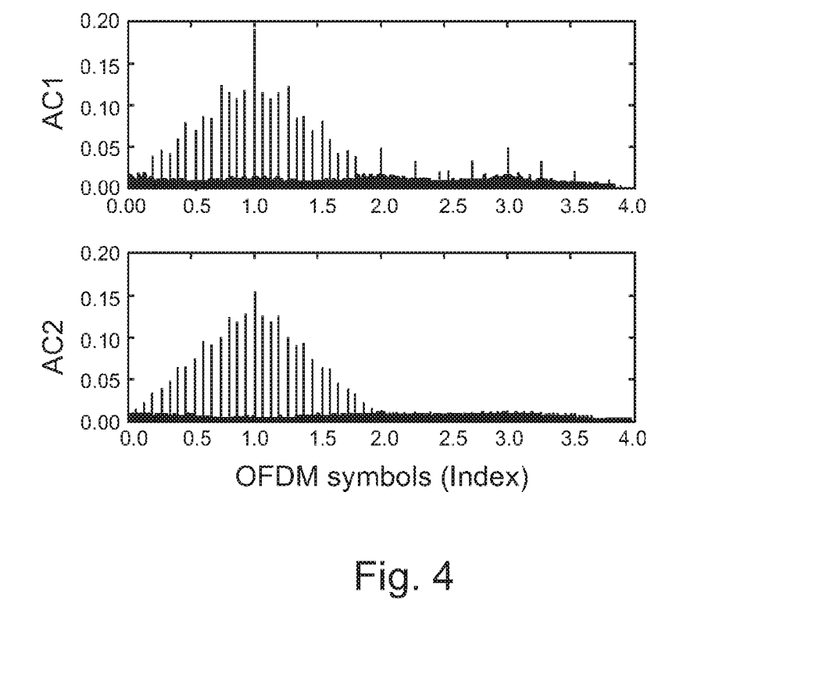
FIG. 4 schematically illustrates correlation of four consecutive DVB-T transmit OFDM symbols containing only pilots with the SP and CP transmitted in the second OFDM symbol (AC1) and with only the SP transmitted in the second OFDM symbol (AC2).

A first approach, i.e. the so-called short channels approach will be now described in greater detail in terms of an exemplary embodiment, in which short channel approach the guard interval G is shorter than 1/12 of the OFDM symbol duration, e.g. G is 1/16 or 1/32 of the OFDM symbol duration. The SP in DVB-T/H standard are spaced apart of 12 sub-carriers, change depending on the OFDM symbol index, see FIG. 1, and have a period of four OFDM symbols. The performance of the proposed algorithm depends on the time domain correlation $R_{pp}(x)$ of (12) of the frequency domain SP. Actually, DVB-T/H standards define both SP and continuous pilot (CP) in the frequency domain. Therefore, the proposed algorithm might try to correlate the received time domain signal with the time domain version of the SP and the CP or only of the SP, treating the remaining CP as noise. In FIG. 4 |c(l)| of (14) is plotted assuming an ideal channel $h_m = \delta(m)$ with no noise and the transmission of four consecutive OFDM symbols. We consider two possible choices of p(k). In the first case (AC1) p(k) is the time domain representation of the SP and the CP of the second OFDM symbol. In the second case (AC2), p(k) is the time domain representation of only the SP of the second OFDM symbol. It can be noticed that the periodicity of the correlation function $R_{pp}(x)$ is N/12 which matches the SP separation of 12 sub-carriers. It can be also noticed that the correlation sequence has good properties, i.e., the correlation between the time shifted versions of the sequence is very low and the correlation between different time domain SP sequences is low too. Preferably, AC2 may be chosen because it may have lower error floor around the main peak. The proposed algorithm described in paragraphs relating to the fine time synchronization algorithm can be applied to this specific scenario. In particular, only step 2 (time domain correlation) is revised so that it defines the following intermediate steps:

Selecting the received SP. The SP sequence depends on the index of the received OFDM symbol. Therefore, it's necessary to detect the SP sequence. Preferably, it is correlated with all four possible SP in the time domain and the SP sequence is selected which provides the largest correlation maximum. The correlation is evaluated only for few points around $t_{0,coarse}$ to avoid waste of resources. After deciding which SP sequence is used, the received OFDM symbol is correlated with the known SP sequence to obtain c(l) of (14).

Solving the ambiguity problem. Since the SP sequence is periodic with period N/12, see FIG. 4, we should decide which taps are from the actual CIR and which ones are from the periodicity of the SP sequence. To solve this ambiguity a window of length L=N/12 is used to detect the maximum energy window that indicates the taps from the actual CIR. Once the ambiguity problem is solved a rough estimate ĥ(m) of the channel impulse response is available and can be used to complete the last steps of the algorithm. If we correlate with the SP in one OFDM symbol also an alternative way to synchronize with respect to the SP sequence prior to the receiver DFT is provided. However, the time domain periodicity of the autocorrelation function may limit the scope of the possible channel impulse responses. Indeed, if the channel is longer than N/12, the rough channel estimation would possibly be affected by aliasing. Therefore, the proposed algorithm for this specific case works satisfactory when the channel is shorter than N/12 samples. But for so-called long channels another approach may be used which will be described in the following.

Figure 5:
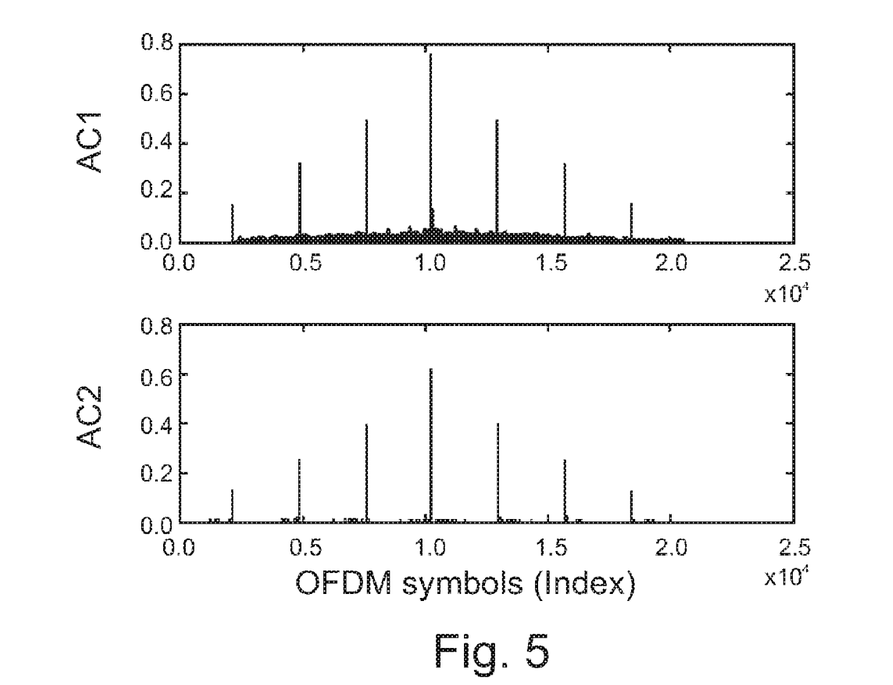
FIG. 5 schematically illustrates a correlation of the sum of four consecutive DVB-T transmit OFDM symbols containing only pilots with all the SP and CP transmitted (AC1) and with only all the SP transmitted (AC2).

Since the DVB-T/H is designed to deal also with long channels the proposed fine synchronization algorithm should be able to deal with the longest channel. The longest guard interval is as long as N/4 and, for the time being, it is assumed to correspond to the maximum length of the channel impulse response. The SP in frequency domain are usually interpolated in time to obtain a denser pilot grid in frequency. According to the following described exemplary embodiment it is proposed to do something similar in the time domain. By summing up four consecutive OFDM symbols in the time domain we obtain a superimposed pilot sequence $$\tilde{p}(k) = \sum_{l=0}^{9} p^{(l)}(k) \tag{17}$$

made of all the SP inserted in the frequency domain. As done in FIG. 4, in FIG. 5 the properties of the autocorrelation function of $\tilde{p}(k)$ in absence of data and in the presence of an ideal channel are shown. Also in this case, treating the CP as noise seems to bring an advantage in the noise floor level. Therefore, the known sequence used at the receiver does not take into account the presence of the CP. The proposed algorithm described in the paragraphs relating to the fine time synchronization algorithm needs to be refined also in this scenario. Step 2 (time domain correlation) now requires the following intermediate steps:

Sum eight consecutive windows of N+G samples starting from the timing reference $t_{0,coarse}$–G to obtain.

$$r_{avg8}(k) = \sum_{i=0}^{7} r(k + i(N + G)) \tag{18}$$

$$k = t_{0,coarse} - G \ldots t_{0,coarse} + N.$$

Given the linearity of the DFT, this is equivalent of summing eight consecutive OFDM symbols in the frequency domain. Preferably, eight instead of the minimum number of four are chosen to include some averaging of the data-generated interference.

Calculate another $r_{avg8}(k)$ so that, in the evaluation of the correlation, a longer sequence can be used, cf. (12).

Correlate $r_{avg8}(k)$ of (18) with the superimposed dense SP grid, i.e. $\tilde{p}(k)$ of (17).

Solve the ambiguity problem. Since the SP sequence is denser, the period of the correlation function is N/3, see FIG. 5, but the ambiguity problem still exists. The ambiguity may be solved similarly to the case of short channels, i.e. using a window of length N/3 to maximum energy window that indicates the taps from the actual CIR.

Once the ambiguity problem is solved a rough estimate ĥ(m) of the channel impulse response is available and can be used to complete the last steps of the algorithm. It is also possible to refine the last step of the algorithm, i.e. the calculation of $t_{0,fine}$ of (9). In the presence of a long guard interval it is likely that $t_{0,fine}$ of (9) is not unique. Therefore, it may be possible to improve the selection of $t_{0,fine}$ by smoothing the metric $P_{IBI}(q)$ of (7). The resulting $t_{0,fine}$ is less sensitive to the noisy estimate of the channel impulse response, but it may also be less precise in the case the minimum value of $P_{IBI}(q)$ is given by few choices of q. The influence of such small modification may have significant influence on the algorithm performance which can be seen by simulation results described further below. The long channel algorithm proposed by an exemplary embodiment is now able to deal with very long channels by exploiting in the time domain the structure of the pilot inserted in the frequency domain. Preferably, at least 16 OFDM symbols are used to obtain reasonable performance. In a typical DVB-T setting with 8 k sub-carriers, this corresponds to a window duration of 18 ms. In case of time varying channels, if suddenly an echo appears, the proposed algorithm might provide incorrect timing for at most 18 ms.

In the following some numerical results relating to the performance of the algorithm according to the exemplary embodiment are described and which were obtained through simulations. For the simulation it is assumed an SFN channel made of two independent typical urban (TU), six paths channel as defined in the European project COST. The channel energy is equally distributed between the two TU6 echoes. The separation of the two echoes changes depending on the simulation setting. The transmitter and receiver follow the DVB-T standard with the selected parameters reported in Table I.

TABLE I

SYSTEM SETTINGS: DVB-T.

| Name | Symbol | Value |
| --- | --- | --- |
| OFDM symbol duration | $T_{OFDM}$ | 1.12 ms |
| Useful duration | $T_u$ | 896 µs |
| Guard interval duration | $T_G$ | 224 µs |
| Number of sub-carriers | N | 8192 |
| Bit mapper | M-QAM | 16-QAM |
| Coding rate | r | 2/3 |
| Carrier frequency | $f_c$ | 500 MHz |

To test the performance of the synchronization algorithm, a DVB-T signal is generated, transmitted through the channel and then randomly select a window as long as two OFDM symbols to search for the coarse timing synchronization. In most of the cases the SNR, in terms of carrier-to-noise (C/N) ratio as defined in the DVB-T standard, is set to 25 dB which is close to the operational point of DVB-T. It is further assumed that the equalization perfectly knows the channel. The channel is not known by the synchronization algorithm.

Figure 6:
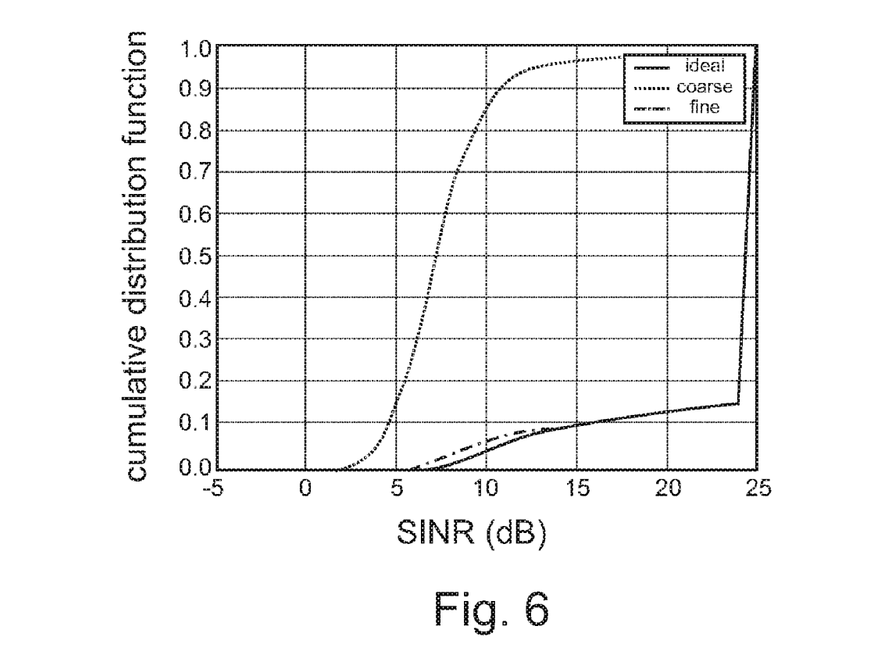
FIG. 6 schematically illustrates a cumulative distribution function of the SINR provided by the synchronization algorithm according to an exemplary embodiment, by the ideal synchronization and by the coarse time synchronization only. Short channel case with the two TU6 echoes with a random relative delay with a uniform distribution within the guard interval, SNR=25 dB, G=N/16.

In the following the short channel algorithm according to the exemplary embodiment described above is examined and is evaluated in terms of the SINR provided by $t_{0,fine}$. The SINR depends on the channel impulse response, cf. (7), which is assumed to be perfectly known in the SINR formula used to evaluate the algorithm performance. In FIG. 6, the cumulative distribution function of the SINR provided by the ideal synchronization, the coarse synchronization and the synchronization algorithm according to the exemplary embodiment is depicted. With $P_s$ and $P_\eta$ the signal and noise power respectively and from (7), the SINR as a function of the synchronization point $t_0$ reads as $$SINR(T_0) = \frac{P_S}{P_\eta + P_{IBI}(t_0)} \quad (19)$$

A guard interval G=N/16 is assumed so that there is no aliasing in the channel impulse response estimate. The channel is an echo-TU6 channel with a relative delay between the two TU-6 uniformly distributed within the guard interval. It should be noted that, also in the case of ideal time synchronization, there may be a percentage of the channel realizations which provide low SINR. This may happen when the channel is longer than the guard interval and there is inevitable IBI. It can be also noticed that the algorithm proposed by the exemplary embodiment may perform very closely to the ideal synchronization algorithm when the channel is shorter than the guard interval and also when the channel is longer than the guard interval.

Figure 7:
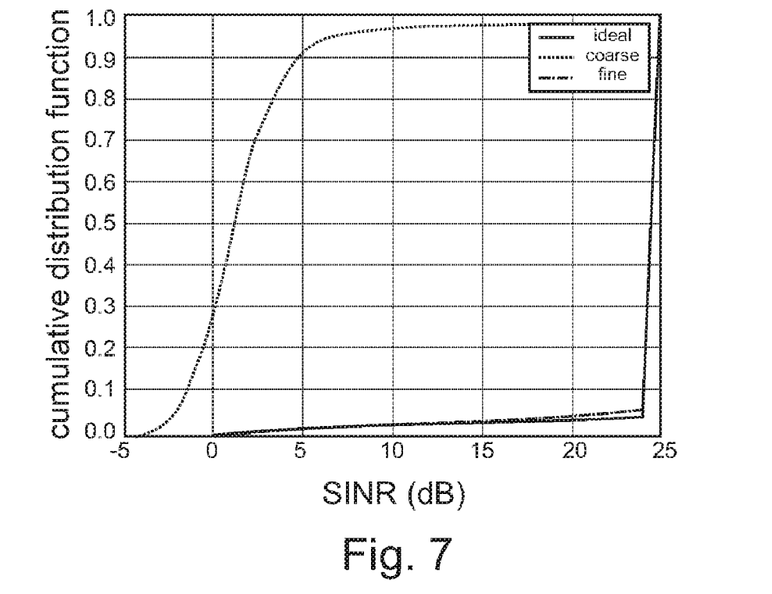
FIG. 7 schematically illustrates a cumulative distribution function of the SINR provided by the synchronization algorithm according to an exemplary embodiment, by the ideal synchronization and by the coarse time synchronization only. Long channel case with the two TU6 echoes with a random relative delay with a uniform distribution within the guard interval, SNR=25 dB, G=N/4.
Figure 8:
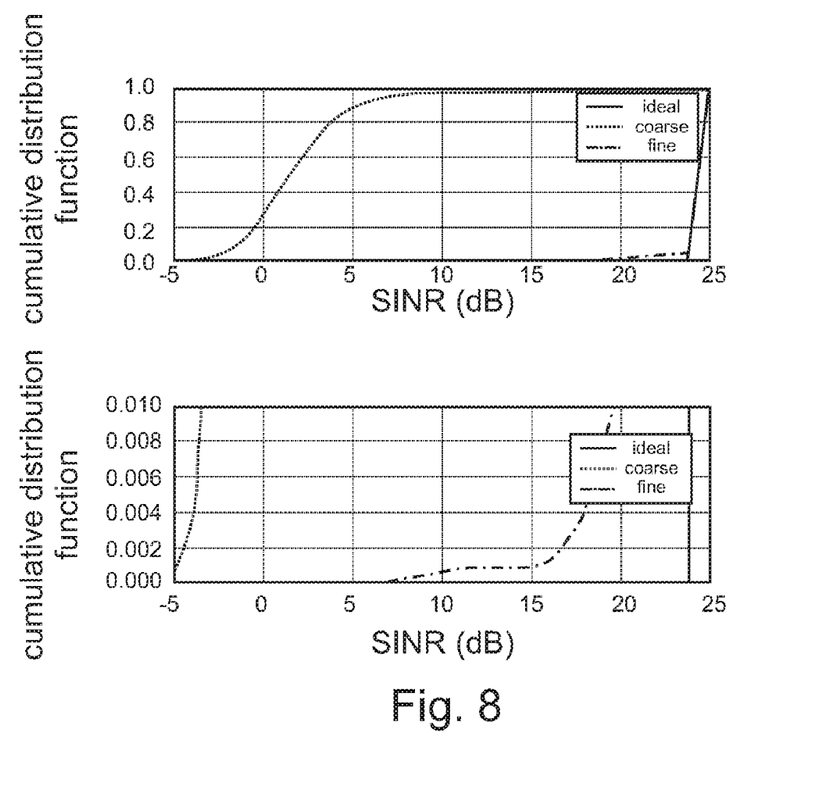
FIG. 8 schematically illustrates a cumulative distribution function of the SINR provided by the synchronization algorithm according to an exemplary embodiment, by the ideal synchronization and by the coarse time synchronization only. Long channel case with the two TU6 echoes with a relative delay with as long as 90% of the guard interval, SNR=25 dB, G=N/4.

In the following the long channel algorithm according to the exemplary embodiment described above is examined and its performance is evaluated in terms of the SINR provided by $t_{0,fine}$. The same assumptions in the SINR calculation are made as in the case of short channels. In FIG. 7, the cumulative distribution function of the SINR of (19) provided by the proposed algorithm, the ideal synchronization algorithm and the coarse synchronization algorithm are depicted. The channel is an echo-TU6 channel with the relative delay between the two TU6 having a uniform distribution within the guard interval. Also in this case (long channel) the algorithm shows its robustness also to channels longer than the guard interval providing an SINR very close to the SINR given by the ideal synchronization.

OFDM systems are usually properly designed, i.e. the guard interval is longer than the maximum delay spread. For this reason it is also focused on the case of a fixed separation of the two TU6 echoes equal to 90% of the guard interval. This is a challenging scenario for the coarse synchronization algorithm. The results are reported in FIG. 8, in a full scale and with a zoom in the most interesting region. Please notice that the ideal synchronization algorithm always provides an SINR=SNR=25 dB, i.e. there is always an IBI free region available. The synchronization algorithm according to the exemplary embodiment is very robust and reliable. For instance, one can notice that in 99% of the cases, the proposed algorithm provide an SINR>20 dB and that only 0.01% of the times it provides an SINR<15 dB.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method of synchronizing multi-carrier systems, the method comprising:
    inserting a predetermined frequency domain signal into a signal on a transmitter side of a multi-carrier system to create a combined signal;
    multi-carrier modulating the combined signal, wherein the multi-carrier modulating is an inverse discrete Fourier transform;

transmitting the multi-carrier modulated signal via a carrier channel to a receiving side of the multi-carrier system;

synchronizing the multi-carrier modulated signal by using the predetermined frequency domain signal portion of the transmitted multi-carrier modulated signal, wherein the predetermined frequency domain signal portion is analyzed in a time domain; and demodulating the synchronized multi-carrier modulated signal by a Fourier transform.

2. The method according to claim 1, wherein the multi-carrier system is one system out of a group consisting of:

Orthogonal Frequency Division Multiplexing (OFDM) systems;

Isotropic Orthogonal Transform Algorithm systems; and

Filtered Multi Tone systems.

3. The method according to claim 1, wherein the predetermined frequency domain signal is a frequency domain pilot signal.

4. The method according to claim 1, further comprising:

performing a coarse timing before the synchronizing by using information of a guard interval.

5. The method according to claim 4, wherein the information of the guard interval is a cyclic prefix.

6. The method according to claim 5, further comprising:

detecting the guard interval by maximizing an energy in a channel.

7. The method according to claim 1, further comprising:

calculating a channel estimation based on the predefined frequency domain signal portion of the transmitted multi-carrier modulated signal.

8. A multi-carrier system, the multi-carrier system comprising:

a unit adapted to insert a predetermined frequency domain signal into a signal on a transmitter side of the multi-carrier system to create a combined signal;

a unit adapted to multi-carrier modulate the combined signal, wherein the multi-carrier modulating is an inverse discrete Fourier transform;

a unit adapted to transmit the transformed signal via a carrier channel to a receiving side of the multi-carrier system;

a unit adapted to synchronize the multi-carrier modulated signal by using the predefined frequency domain signal portion of the transmitted multi-carrier modulated signal, wherein the predetermined frequency domain signal portion is analyzed in a time domain; and a unit adapted to demodulate the synchronized multi-carrier modulated signal by a Fourier transform.

9. A non-transitory computer-readable medium, in which a computer program is stored which, when being executed by a processor, is adapted to control or carry out a method of synchronizing multi-carrier systems, the method comprising:

inserting a predefined frequency domain signal into a signal on a transmitter side of a multi-carrier system to create a combined signal;

multi-carrier modulating the combined signal, wherein the multi-carrier modulating is an inverse discrete Fourier transform;

transmitting the multi-carrier modulated signal via a carrier channel to a receiving side of the multi-carrier system;

synchronizing the multi-carrier modulated signal by using the predefined frequency domain signal portion of the transmitted multi-carrier modulate signal, wherein the predetermined frequency domain signal portion is analyzed in a time domain; and demodulating the synchronized multi-carrier modulated signal by a Fourier transform.

10. The method of claim 1, wherein the predetermined frequency domain signal is a frequency domain scatter pilot (SP) signal.

11. The method of claim 1, wherein the predetermined frequency domain signal comprises both frequency domain continuous pilot (CP) and frequency domain scatter pilot (SP) signals.

12. The method of claim 1, wherein the carrier channel is a frequency selective fading channel.

13. The method of claim 1, wherein the synchronizing step uses a scatter pilot (SP) signal in a time domain correlation.

14. The method of claim 1, wherein continuous pilot (CP) signals are treated as noise.

15. The method of claim 1, further comprising:

detecting a scatter pilot (SP) sequence.

16. The method of claim 15, further comprising:

selecting the detected SP sequence that provides a maximum correlation.

17. The method of claim 1, further comprising:

adding a predetermined number of consecutive OFDM symbols in the time domain to obtain a superimposed pilot sequence.

18. The method of claim 1, further comprising:

adding consecutive windows of samples that are equivalent to a predetermined number of consecutive OFDM symbols in the frequency domain.

* * * * *